(12) United States Patent
Yun et al.

(10) Patent No.: US 9,565,290 B2
(45) Date of Patent: Feb. 7, 2017

(54) METHOD FOR PERFORMING FUNCTION IN CALL MODE AND PORTABLE ELECTRONIC DEVICE FOR IMPLEMENTING THE METHOD

(71) Applicant: Samsung Electronics Co., Ltd., Gyeonggi-do (KR)

(72) Inventors: Yongsang Yun, Gyeonggi-do (KR); Changryong Heo, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/288,653

(22) Filed: May 28, 2014

(65) Prior Publication Data

US 2014/0370873 A1    Dec. 18, 2014

(30) Foreign Application Priority Data

Jun. 13, 2013    (KR) .................. 10-2013-0067537

(51) Int. Cl.
*H04M 3/00* (2006.01)
*H04M 1/725* (2006.01)
*H04M 1/02* (2006.01)
*H04M 1/23* (2006.01)
*H04M 1/56* (2006.01)
*H04M 1/57* (2006.01)

(52) U.S. Cl.
CPC ........ *H04M 1/72563* (2013.01); *H04M 1/0264* (2013.01); *H04M 1/233* (2013.01); *H04M 1/56* (2013.01); *H04M 1/57* (2013.01); *H04M 2250/20* (2013.01)

(58) Field of Classification Search
CPC ...... H04M 1/0265; H04M 1/233; H04M 1/56; H04M 1/57; H04M 1/72563; H04M 2250/20; H04M 2250/52
USPC ............................................. 455/418, 575.1
See application file for complete search history.

(56) References Cited

U.S. PATENT DOCUMENTS

| | | | |
|---|---|---|---|
| 2004/0009790 A1* | 1/2004 | Im ..................... | H04M 1/0216 455/556.1 |
| 2004/0203535 A1* | 10/2004 | Kim .................... | H04M 1/021 455/90.3 |
| 2005/0014527 A1* | 1/2005 | Chambers .......... | H04M 1/0264 455/556.1 |
| 2005/0047773 A1* | 3/2005 | Satake ................ | H04M 1/0214 396/301 |
| 2005/0245295 A1* | 11/2005 | Lee .................... | H04M 1/0235 455/575.1 |
| 2006/0274155 A1* | 12/2006 | Kim .................... | H04M 1/0241 348/208.3 |
| 2010/0081478 A1* | 4/2010 | Itoh ..................... | G06F 1/1616 455/566 |
| 2014/0071221 A1* | 3/2014 | Dave ................... | H04M 1/03 348/14.02 |

* cited by examiner

*Primary Examiner* — Marcus Hammonds
(74) *Attorney, Agent, or Firm* — Cha & Reiter, LLC

(57) ABSTRACT

A method and electronic device are disclosed for performing a particular function in a call mode in response to inputs received from a rotating part of a camera. The electronic device includes a wireless communication unit for a call, and a camera having a rotating part. A rotation of the rotating part is recognized while the electronic device operates in a call mode, and, in response to the rotation, a predefined particular function is executed.

15 Claims, 7 Drawing Sheets

METHOD FOR PERFORMING FUNCTION IN CALL MODE AND PORTABLE ELECTRONIC DEVICE FOR IMPLEMENTING THE METHOD

CLAIM OF PRIORITY

This application claims the benefit under 35 U.S.C. §119(a) of a Korean patent application filed on Jun. 13, 2013 in the Korean Intellectual Property Office and assigned Serial No. 10-2013-0067537, the entire disclosure of which is hereby incorporated by reference.

TECHNICAL FIELD

The present disclosure relates to a method for performing a particular function in a call mode and a portable electronic device for implementing the method.

BACKGROUND

Nowadays a portable electronic device such as a smart phone can perform a great variety of functions such as a call, a camera, a chat function, internet access, and the like. For example, a portable electronic device can display various shortcut icons and perform a particular function in response to a user input associated with one of the displayed icons. A user who is using a portable electronic device in a call mode may often desire to perform such a particular function without leaving a call mode.

SUMMARY

Accordingly, the present disclosure provides a method and apparatus for easily and rapidly performing a desired particular function in a call mode by using a rotating part disposed on a body tube of a camera in a portable electronic device having the camera.

In one embodiment of this disclosure, a method for executing a function based on rotation of a rotating part is disclosed. A rotation of the rotating part is detected at a time the electronic device is operating in a call mode; and a predefined particular function is executed in response to the rotation.

In another embodiment in this disclosure, an electronic device includes a camera having a rotating part, and a wireless communication unit configured to support a call function. A function performing module is configured to recognize a rotation of the rotating part in a call mode, and to execute a predefined particular function in response to the rotation. At least one processor is configured to execute the function performing module.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely examples. Accordingly, those of ordinary skill in the art will recognize that various changes and modifications of the embodiments described herein can be made without departing from the ambit of the present disclosure. In addition, descriptions of well-known functions and implementations may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purposes and not for the purpose of limiting the present disclosure as defined by the appended claims and their equivalents.

It is to be understood that the singular forms "a," "an," and "the" include plural referents unless the context clearly dictates otherwise. Thus, for example, reference to "a function" includes reference to one or more of such functions.

In the present disclosure, an electronic device refers to any kind of portable device including a mobile phone, a smart phone, a digital camera, a tablet PC, an e-book reader, a personal digital assistant (PDA), a portable multimedia player (PMP), a media player (e.g., an MP3 player), a digital broadcasting terminal, a portable game console, an electronic dictionary, an electronic scheduler, a wearable computing device (e.g., a watch, glasses, etc.), or any other equivalents. Additionally, an electronic device disclosed herein has a camera therein. This camera contains a rotating part, which may have a ring shape enclosing a body tube of the camera.

An electronic device disclosed herein may offer a user an interaction capable of performing a particular function through a rotating part. Particularly, when a user rotates a rotating part in a call mode, an electronic device in this disclosure may perform a predefined function (e.g., the transmission of predetermined information to an external device, the removal of surrounding noises, the termination of a call, a switch of a call, a redial, and the like) in response to the rotation of the rotating part.

Figure 1:
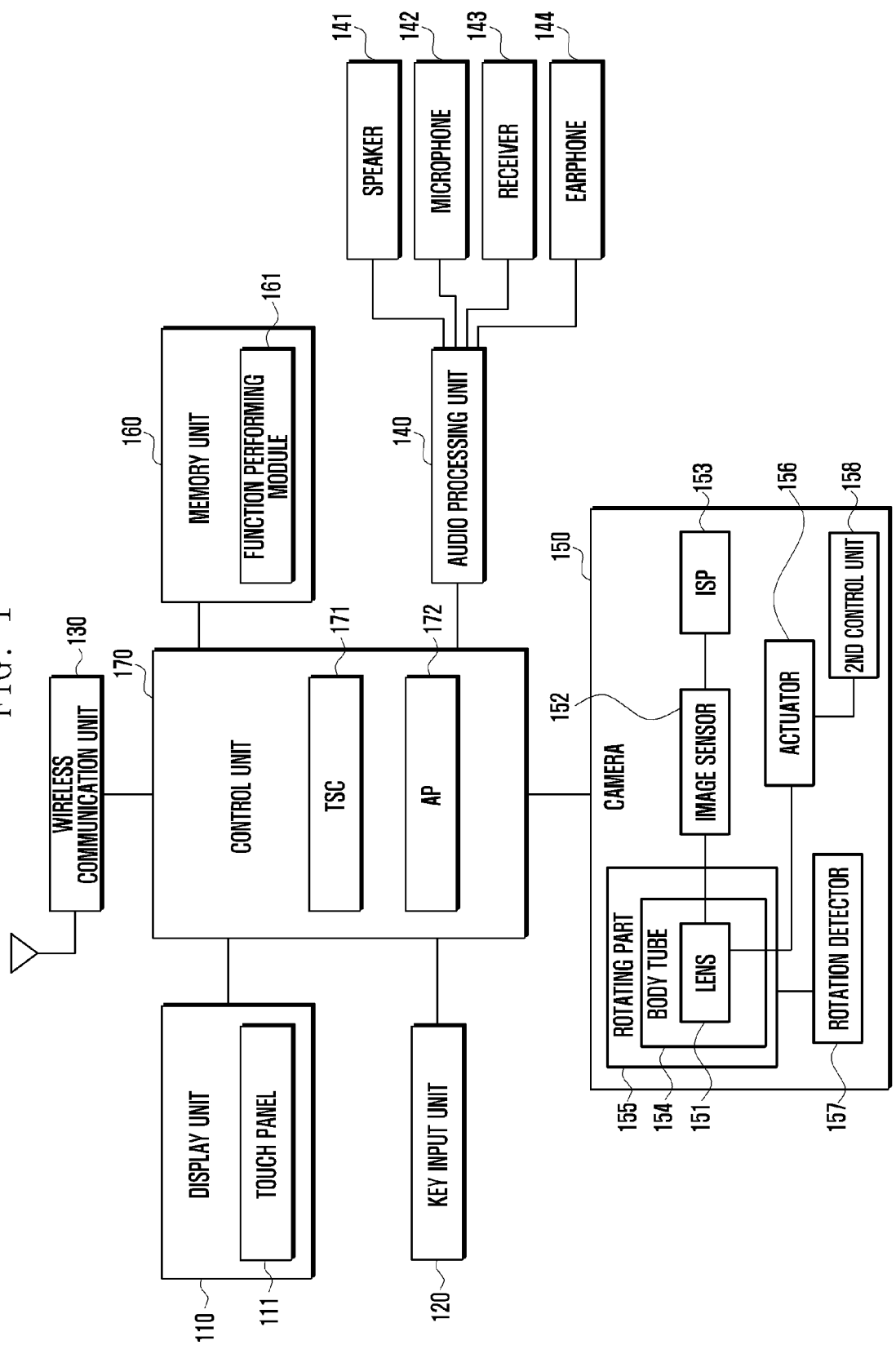
FIG. 1 is a block diagram illustrating an electronic device in accordance with an embodiment of the present disclosure.

FIG. 1 is a block diagram illustrating an electronic device in accordance with an embodiment of the present disclosure.

Referring to FIG. 1, the electronic device 100 may include a display unit 110, a key input unit 120, a wireless communication unit 130, an audio processing unit 140, a speaker 141, a microphone 142, a receiver 143, an earphone 144, a camera 150, a memory unit 160, and a control unit 170.

The display unit 110 may display various types of information on a screen under the control of the control unit 170, especially, an application processor. For example, when the control unit 170 processes (e.g., decodes) information and then stores it in a memory (e.g., a frame buffer), the display unit 110 may convert data stored in the frame buffer into analog signals and then display them on the screen. The display unit 110 may be formed of LCD (Liquid Crystal Display), AMOLED (Active Matrix Organic Light Emitted Diode), a flexible display, or a transparent display.

When electric power is supplied to the display unit 110, the display unit 110 may display a lock image on the screen thereof. If a predefined unlocking user input (e.g., a password input or a pattern gesture) is detected, the control unit 170 may perform an unlocking process and control the display unit 110 to display any other predefined image such as a home image on the screen. This home image may contain a background image and a plurality of icons displayed and arranged thereon. Each icon may indicate a specific application or content (e.g., a photo file, a video file, a voice recording file, a document, a message, etc.). If any user input for selecting a specific application icon is detected, the control unit 170 may execute a corresponding application linked to the selected icon and control the display unit 110 to display an execution image of that application on the screen. Meanwhile, any screen may be referred to as a name associated with a displaying target. For example, a lock screen, a home screen, and an execution screen may refer to a screen for displaying a lock image, a screen for displaying a home image, and a screen for displaying an execution image of an application, respectively.

The display unit 110 may include a touch panel 111 installed at a screen thereof. Specifically, the touch panel 111 may be disposed on the screen of the display unit 110 (i.e., referred to as add-on type) or inserted in the display unit 110 (i.e., referred to as on-cell type or in-cell type).

The touch panel 111 may include a finger touch panel formed of a capacitive type. The finger touch panel may have a plurality of scan input ports (hereinafter, scan ports) and a plurality of sensing output ports (hereinafter, sensing ports). The finger touch panel may create sensing information (e.g., a variation of capacitance) in response to a touch of a conductive object (e.g., a finger) by means of scan control signals entered to the scan ports from a touch screen controller of the control unit 170, and then transfer the sensing information to the touch screen controller.

The touch panel 111 may include a pen touch panel which is also known as a digitizer sensor substrate. The pen touch panel may be formed of an electromagnetic resonance (EMR) type. Therefore, the pen touch panel may create sensing information in response to a hovering or touch of a stylus pen specially produced to form a magnetic field, and then transfer the sensing information to the touch screen controller of the control unit 170. Additionally, the pen touch panel may have a button. When a user presses this button, a magnetic field generated from a coil of the pen may be varied. Then the pen touch panel may create sensing information in response to a variation of magnetic field and transfer it to the touch screen controller of the control unit 170.

The key input unit 120 may include at least one touch key formed of a capacitive type. The touch key may create sensing information in response to a touch of a conductive object and transfer it to a touch key controller of the control unit 170.

The key input unit 120 may further include any other type key than a touch type key. For example, the key input unit 120 may have at least one dome key. If a user presses down a dome key, the dome key may be transformed and thereby come in contact with a printed circuit board. Therefore, a key event may be created from the printed circuit board and transferred to the control unit 170. Meanwhile, any key of the key input unit 120 may be referred to as a 'hard key,' and a virtual key displayed on the display unit 110 may be referred to as a 'soft key.'

The wireless communication unit 130 may perform a voice call, a video call, or a data communication with any external entity through a network under the control of the control unit 170. The wireless communication unit 130 may include a mobile communication module (e.g., a 3-generation mobile communication module, a 3.5-generation mobile communication module, a 4-generation mobile communication module, etc.), a digital broadcast module (e.g., a DMB module), and/or a short-range communication module (e.g., a Wi-Fi module, a Bluetooth module, an NFC (Near Field Communication) module, etc.).

The audio processing unit 140 may perform the input and output of audio signals (e.g., voice data) for speech recognition, voice recording, voice modulation, digital recording, and a call in conjunction with the speaker 141, the microphone 142, the receiver 143, and the earphone 144. Specifically, the audio processing unit 140 may receive audio signals (e.g., voice data) from the control unit 170, convert the received audio signals into analog signals through a digital-to-analog conversion, then amplify and output them to the speaker 141, the receiver 143 or the earphone 144. The earphone 144 may be connected to or disconnected from the electronic device 100 through an ear jack. When the earphone 144 is connected to the audio processing unit 140, the audio processing unit 140 may output audio signals to the earphone 144. In case a call mode is a speaker mode, the audio processing unit 140 may output audio signals to the speaker 141. In case a call mode is a receiver mode, the audio processing unit 140 may output audio signals to the receiver 143. The speaker 141, the receiver 143 and the earphone 144 may convert audio signals, received from the audio processing unit 140, into sound waves and then output them. The microphone 142 may convert sound waves, received from humans or any other sound sources, into audio signals. Meanwhile, the earphone 144 may be a quadrupole earphone, namely, an earphone having a microphone. The audio processing unit 140 may convert audio signals, received from the microphone 142 or the microphone of the earphone 144, into digital signals through an analog-to-digital conversion, and then transfer them to the control unit 170.

Under the control of the control unit 170, the audio processing unit 140 may offer a user an auditory feedback (e.g., voice or sound) associated with a particular function performed in response to the rotation of the rotating part 155 of the camera 150. For example, in case predetermined information is transmitted to an external device in response to the rotation of the rotating part 155, the audio processing unit 140 may reproduce voice or sound data to announce the transmission of information. In case a function to remove surrounding noises is performed in response to the rotation of the rotating part 155, the audio processing unit 140 may reproduce voice or sound data to announce the removal of surrounding noises. Additionally, an auditory feedback may be associated with the termination of a call, a switch of a call, a redial, and the like.

The camera 150 captures an image of a subject for photography. The captured image may be stored in the memory unit 160 or displayed on the display unit 110 by the control unit 170. The camera 150 may include a lens 151 for collecting light, an image sensor 152 for converting collected light into electric signals, and an image signal processor (ISP) 153 for processing electric signals, received from the image sensor 152, to raw data and then outputting them to the control unit 170.

The lens 151 may have an object lens and an ocular lens. The object lens is located toward a subject for photography and used to form an image of the subject. The ocular lens enlarges an image formed by the object lens. Additionally, the lens 151 may further have at least one lens located between the object lens and the ocular lens. A focal length can be adjusted depending on a distance between such lenses. A focal length of the camera 150 may refer to a distance from the lens 151 to a focal plane which is the plane upon which the lens 151 is actually focused. The image sensor 152 is located at a focal plane and records an image focused. If an image of the subject is formed on the image sensor 152, the subject may be clearly displayed. If an image of the subject is not formed on the image sensor 152, the subject may be unclearly displayed. Therefore, in case the subject is at a distance, the camera 150 may reduce a focal length such that an image of the subject is formed on the image sensor 152. In contrast, in case the subject is relatively nearby, the camera 150 may increase a focal length such that an image of the subject is formed on the image sensor 152.

The ISP 153 may have a module for processing raw data to a preview image and then outputting the preview image to the control unit 170, and a module for processing raw data to a compressed image and then outputting the compressed image to the control unit 170. The preview image may refer to an image displayed on the screen and resized from raw data to be adapted to the size of the screen. Namely, the preview image may be low resolution data reduced in size from high resolution data. The compressed image may refer to an image stored in the memory unit 160 and compressed from raw data by means of specific format such as JPEG or the like.

The camera 150 may further include the body tube 154 connecting the lens 151 and the image sensor 152 and providing a path for transmission of light received through the lens 151, the rotating part 155 enclosing the body tube 154 and configured to be rotatable, a rotation detector 157 configured to create rotation sensing information by detecting the rotation of the rotating part 155 and to transfer the created information to the control unit 170, and an actuator 156 for adjusting a focal length. The control unit 170 may control the actuator 156 to adjust a focal length, based on rotation sensing information. Namely, the control unit 170 outputs a control signal for adjusting a focal length to the actuator 156. If the rotating part 155 is rotated by a user while the electronic device 100 operates in a call mode, the control unit 170 may deactivate the actuator 156 (namely, outputting no control signal to the actuator 156) and instead perform a predefined function.

The camera 150 may also include the second control unit 158, which can control the actuator 156, taking the place of the control unit 170. The second control unit 158 may control the actuator 156 to adjust a focal length and output a value of an adjusted focal length to the control unit 170. The second control unit 158 may be separated from the camera 150 and, in some cases, included in the control unit 170. Meanwhile, the second control unit 158 may control other elements of the camera 150, for example, the image sensor 152 and the like.

The camera 150 may further include a plurality of zoom rings which are also referred to as focusing rings. In this case, the actuator 156 may decrease or increase a space between the zoom rings under the control of the control unit 170. In case of a decreased space, a distance between the object lens of the lens 151 and the image sensor 152 may become shorter. In case of an increased space, a distance between the object lens of the lens 151 and the image sensor 152 may become greater.

The rotation detector 157 may have a hall sensor. The rotating part 155 may have a ring shape enclosing the body tube 154, and a plurality of magnets may be mounted on the inner surface of such a ring. In this case, the hall sensor may be disposed at the body tube 154. If the rotating part 155 is rotated, the hall sensor creates rotation sensing information and sends the rotation sensing information to the control unit 170. The rotation detector 157 may alternatively have an optical sensor. In this case, the rotating part 155 may have any material (e.g., fluorescent material) for reflecting light emitted from the optical sensor, and the optical sensor may be disposed at the body tube 154. The optical sensor emits light toward the rotating part 155 and receives light reflected by fluorescent material. Then the optical sensor creates rotation sensing information by using received light and sends the rotation sensing information to the control unit 170.

Meanwhile, in addition to such a sensor for detecting the rotation of the rotating part 155, the electronic device 100 may further include an acceleration sensor, a terrestrial magnetism sensor, a gyro sensor, a proximity sensor, or the like. Using such sensors, the control unit 170 may recognize a motion and status of the electronic device 100. For example, in case of a call function using the receiver 143, the control unit 170 may activate the proximity sensor (e.g., realized as an optical sensor) and receive sensing information from the activated proximity sensor. Then the control unit 170 may analyze the received sensing information and thereby check whether a user is on the phone by holding the receiver 143 to his or her ear. If so, the control unit 170 may turn off the screen by stopping the supply of electric power to the display unit 110.

The memory unit 160 may store, under the control of the control unit 170, data created in the electronic device 100 or received from any external entity via the wireless communication unit 130. Also, the memory unit 160 may have a buffer that temporarily stores data. And also, the memory unit 160 may store various types of setting information (e.g., screen brightness, a feedback vibration in response to a touch, an automatic rotation of screen, etc.) for setting usage environments of the electronic device 100. By referring to setting information, the control unit 170 may operate the electronic device 100.

The memory unit 160 may store various programs for the operation of the electronic device 100, e.g., a booting program, at least one operating system (OS), and at least one application. Particularly, the memory unit 160 may store a function performing module 161, which may be a program specially designed to perform a particular function in response to the rotation of the rotating part 155. Specifically, the function performing module 161 may be configured to execute a task for recognizing the rotation of the rotating part 155, and a task for performing a predefined function in response to the recognized rotation in case the electronic device 100 is currently operating in a call mode. Here, a predefined function may be a particular function corresponding to at least one of a rotating direction or a rotating quantity (e.g., a rotating angle). For this, the function performing module 161 may be configured to execute a task for recognizing the position of the rotating part 155 (e.g., the position of magnets or fluorescent material disposed at the rotating part 155) by using rotation sensing information received from the rotation detector 157, a task for calculating a rotating direction and quantity caused by variations in the position of the rotating part 155, and a task for performing a particular function corresponding to a calculated value. Here, a particular function may be predefined by a manufacturer of the electronic device 100 or set by a user of the electronic device 100. For this setting, the electronic device 100 may offer a graphical user interface such that a user can set a selected function corresponding to rotation. A predefined particular function may be a function corresponding to the position of the rotating part 155 after rotation. Namely, the function performing module 161 may be configured to execute a task for performing a function corresponding to the position of the rotating part 155 recognized after the rotation of the rotating part 155.

The memory unit 160 may have a main memory and a secondary memory. The main memory may be formed of RAM and the like. The secondary memory may be formed of disk, RAM, ROM, flash memory, and the like. The main memory may store various programs, e.g., a booting program, an operating system and applications, which are loaded from the secondary memory. When electric power is supplied from a battery to the control unit 170, the booting program may be loaded first on the main memory. The booting program may load the operating system on the main memory, and then the operating system may load a selected application on the main memory. The control unit 170 (e.g., an application processor) may access the main memory, interpret commands (i.e., routines) of loaded programs, and perform a function according to an interpretation result. Namely, various programs may be loaded on the main memory and then run as a processor.

The control unit 170 may control the whole operation of the electronic device 100, control signal flows between internal components of the electronic device 100, perform data processing, and control the supply of power from a battery to the respective components. The control unit 170 may include a touch screen controller (TSC) 171 and an application processor (AP) 172.

The touch screen controller 171 may receive sensing information from the touch panel 111 and analyze the received information in order to recognize inputs such as a touch, a hovering, a press of a pen button, etc. In response to a hovering, the touch screen controller 171 may determine a hovering region on the touch screen and calculate hovering coordinates (x_hovering, y_hovering) in the hovering region. Then the touch screen controller 171 may transfer a hovering event including the calculated hovering coordinates to the application processor 172. This hovering event may also include a depth value. For example, a hovering event may include three-dimensional hovering coordinates (x, y, z) in which the z value may denote a depth. Similarly, in response to a touch, the touch screen controller 171 may determine a touch region on the touch screen and calculate touch coordinates (x_touch, y_touch) in the touch region. Then the touch screen controller 171 may transfer a touch event including the calculated touch coordinates to the application processor 172. Meanwhile, in response to a press of a pen button, the touch screen controller 171 may transfer a pen button event to the application processor 172.

The application processor 172 may receive a touch screen event (e.g., a hovering event, a touch event, a pen button event, etc.) from the touch panel 111 and perform a particular function corresponding to the touch screen event. Additionally, the application processor 172 may receive a touch key event from a touch key and perform a particular function corresponding to the touch key event.

The application processor 172 may execute a variety of programs stored in the memory unit 160. Namely, the application processor 172 may load various programs from the secondary memory to the main memory and then activate them as processes.

Meanwhile, the control unit 170 may further include various processors in addition to the application processor 172. For example, the control unit 170 may include a graphic processing unit (GPU) for graphic processing. Additionally, in case the electronic device 100 has a mobile communication module (e.g., a 3-generation mobile communication module, a 3.5-generation mobile communication module, a 4-generation mobile communication module, etc.), the control unit 170 may further include a communication processor (CP) that is in charge of mobile communication processing. Such processors may be formed of a single package into which two or more independent cores (e.g., quad-core) are integrated as a single integrated circuit (IC). For example, the application processor 172 may be integrated as a single multi-core processor. Also, such processors may be integrated into a single chip (i.e., system on chip or "SoC"). Alternatively, such processors may be packaged in the form of multi-layer.

Meanwhile, although not discussed above, the electronic device 100 may further include any other elements such as a GPS (Global Positioning System) module, a vibration motor, and the like. The GPS module calculates the position of the electronic device 100 by precisely timing the signals sent by GPS satellites. A calculated result may include latitude, longitude and/or altitude information, and be provided to the control unit 170. The vibration motor creates vibration under the control of the control unit 170. For example, when the rotation of the rotating part 155 is recognized, the control unit 170 may control the vibration motor to vibrate.

Figure 2A:
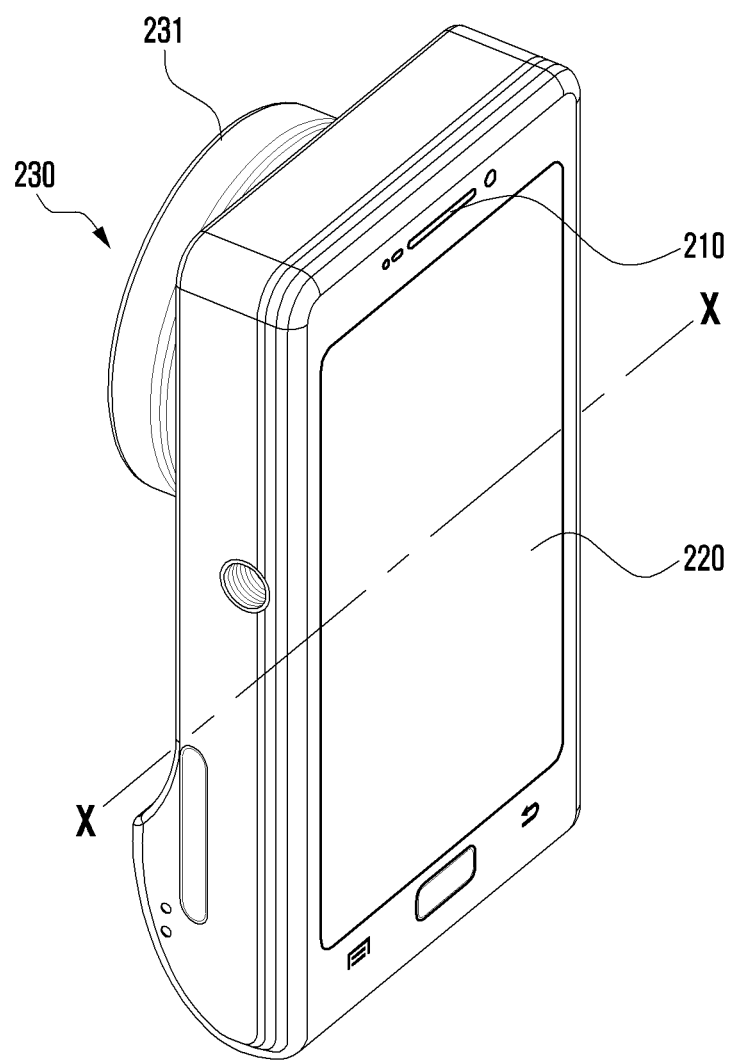
FIG. 2A is a perspective view illustrating an external appearance of an electronic device in accordance with an embodiment of the present disclosure.
Figure 2B:
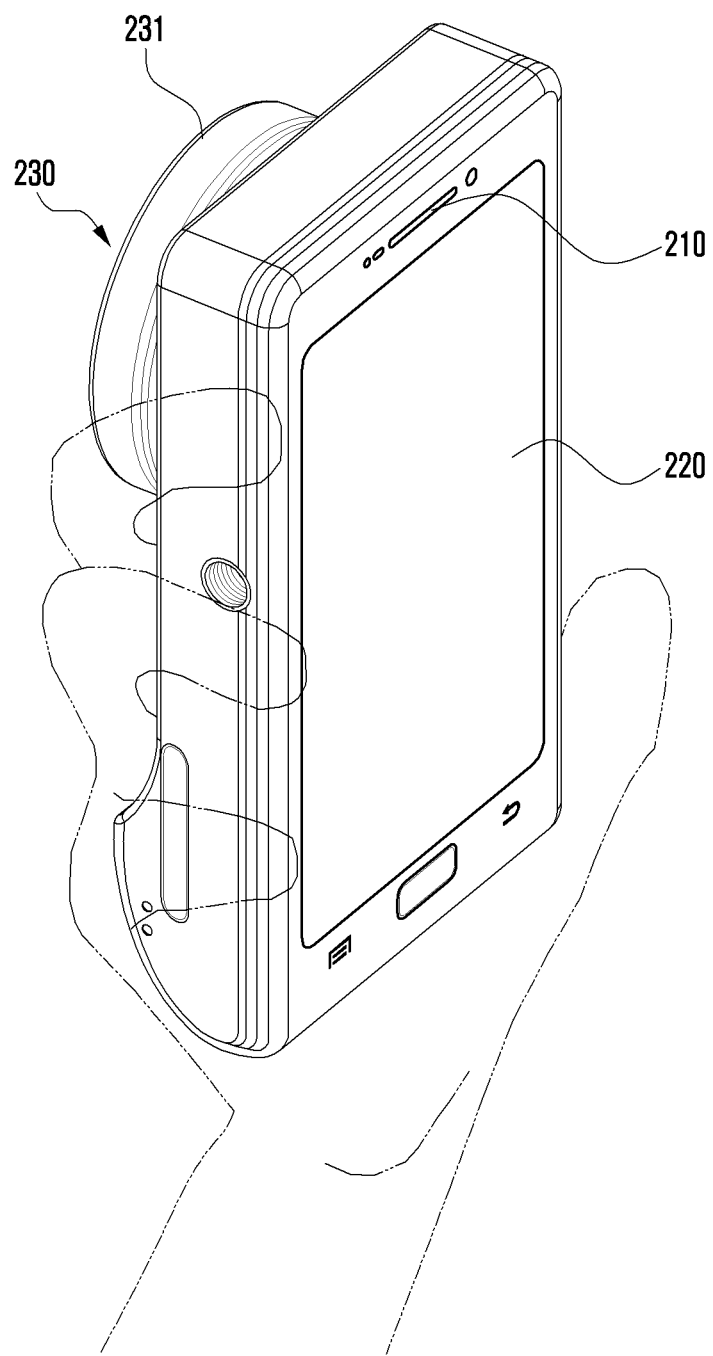
FIG. 2B is a perspective view illustrating a state where a user grips an electronic device in accordance with an embodiment of the present disclosure.

FIG. 2A is a perspective view illustrating an example external appearance of an electronic device in accordance with an embodiment of the present disclosure, and FIG. 2B is a perspective view illustrating an example state where a user grips an electronic device in accordance with an embodiment of the present disclosure.

Referring first to FIG. 2A, a receiver 210 and a touch screen 220 are disposed on the front face of the electronic device, and a camera 230 including a rotating part 231 is disposed on the rear face of the electronic device. Especially, the receiver 210 is disposed at an upper portion of the front face, and correspondingly the camera 230 is disposed at a lower portion of the rear face. Namely, the receiver 210 and the camera 230 are disposed respectively at similar positions on opposite sides of the electronic device. Meanwhile, the touch screen 220 which acts as the display unit 110 shown in FIG. 1 is disposed below the receiver 210 on the front face of the electronic device.

Referring to FIG. 2B, when a user grips the electronic device and is on the phone by holding the receiver 210 to his or her ear, a user can easily rotate the rotating part 231 with his or her finger. Meanwhile, for an easy rotation, the rotating part 231 may be located on a body tube of the camera 230. In case the body tube can be separated from the camera 230, the rotating part 231 may be located at a coupling part connected to the camera 230.

Figure 3:
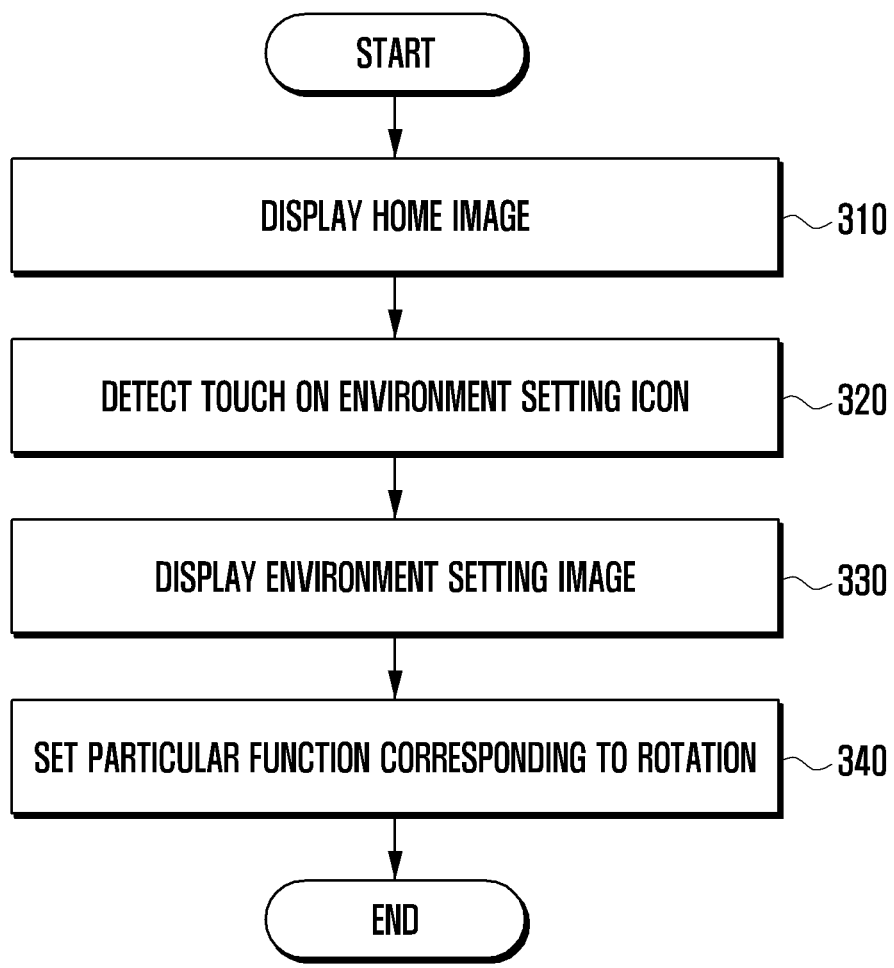
FIG. 3 is a flow diagram illustrating a process of setting a particular function corresponding to the rotation of a rotating part in accordance with an embodiment of the present disclosure.

FIG. 3 is a flow diagram illustrating an example process of setting a particular function corresponding to the rotation of a rotating part in accordance with an embodiment of the present disclosure.

Referring to FIGS. 1 and 3, at operation 310, the control unit 170 may control the display unit 110 to display a home image on the screen. Here, the home image may contain an environment setting icon, namely, a specific icon corresponding to environment setting. At operation 320, the control unit 170 may detect a touch on the environment setting icon from such a home screen. Then, at operation 330, the control unit 170 may control the display unit 110 to display an environment setting image on the screen. At operation 340, the control unit 170 may set a function corresponding to the environment, especially rotation, of the electronic device in response to a user's manipulation on such an environment setting screen. Setting information may be stored in the memory unit 160. When the rotating part 155 is rotated by a user in a call function, the setting information may be utilized by the control unit 170.

Figure 4:
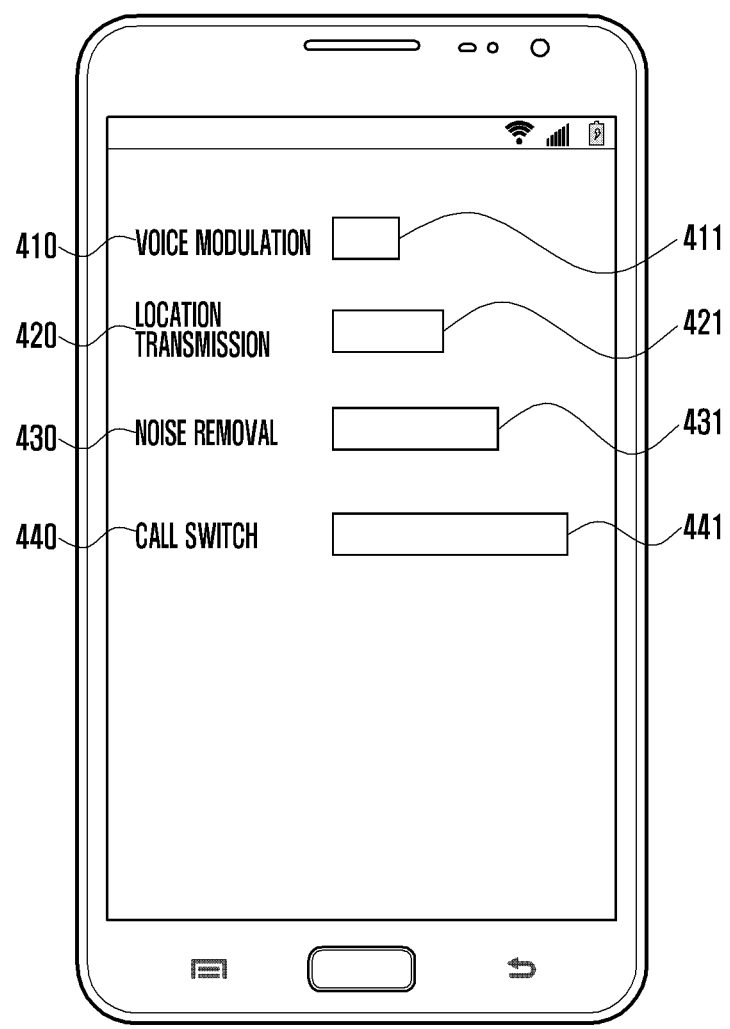
FIG. 4 is a screenshot illustrating a setting screen used for setting a particular function corresponding to the rotation of a rotating part in accordance with an embodiment of the present disclosure.

FIG. 4 is a screenshot illustrating an example setting screen used for setting a particular function corresponding to the rotation of a rotating part in accordance with an embodiment of the present disclosure.

Referring to FIGS. 1 and 4, the display unit 110 may display, on the screen, an image designed for setting a function corresponding to rotation under the control of the control unit 170. Such a setting screen may contain, for example, but is not limited to, a voice modulation item 410 for modulating a voice signal received from the microphone 142 and then transmitting the modulated signal to the other party's device of a current call, an information transmission item 420 for transmitting predefined information (e.g., location data) to any external device (e.g., the other party's device of a current call), a noise removal item 430 for removing a noise (e.g., echo noise) from a voice signal received from the microphone 142 and then sending the noise-removed signal to the other party's device of a current call, and a call switch item 440 for switching a current call from the first other party's device to the second other party's device. Additionally, the setting screen may further contain an item for redialing a previous call, an item for terminating a current call, and the like.

Different functions may be linked to different rotating quantities. For example, as shown in FIG. 4, the voice modulation item 410 may be linked to a rotating quantity of the first level 411, and the information transmission item 420 may be linked to a rotating quantity of the second level 421. Similarly, the noise removal item 430 may be linked to a rotating quantity of the third level 431, and the call switch item 440 may be linked to a rotating quantity of the fourth level 441. These levels 411, 421, 431 and 441 may correspond to different rotating angles. For example, the first level 411 may be 0-45 degrees, the second level 421 may be 45-90 degrees, the third level 431 may be 90-135 degrees, and the fourth level 441 may be greater than 135 degrees.

If a user rotates the rotating part 155 in a call, the rotation detector 157 detects the rotation of the rotating part 155, creates sensing information, and transfers the created information to the control unit 170. Then, based on the sensing information, the control unit 170 calculates a rotating angle. Further, by referring to setting information stored in the memory unit 160, the control unit 170 performs a particular function corresponding to the calculated angle. For example, in case the calculated rotating angle falls within 0-45 degrees, the control unit 170 performs a voice modulation. In case the calculated rotating angle falls within 45-90 degrees, the control unit 170 performs an information transmission. In case the calculated rotating angle falls within 90-135 degrees, the control unit 170 performs a noise removal. In case the calculated rotating angle is greater than 135 degrees, the control unit 170 performs a call switch.

Meanwhile, respective functions may be linked to different rotating directions. In this case, the control unit 170 calculates a rotating direction, using sensing information received from the rotation detector 157. If the calculated rotating direction is a clockwise direction, the control unit 170 performs a particular function linked to a clockwise direction. In contrast, if the calculated rotating direction is a counterclockwise direction, the control unit 170 performs a particular function linked to a counterclockwise direction.

Additionally, respective functions may be linked to both rotating quantities and rotating directions. In this case, the control unit 170 calculates both a rotating direction and a rotating quantity, using sensing information received from the rotation detector 157. Then the control unit 170 performs a particular function linked to the calculated rotating direction and quantity.

Figure 5:
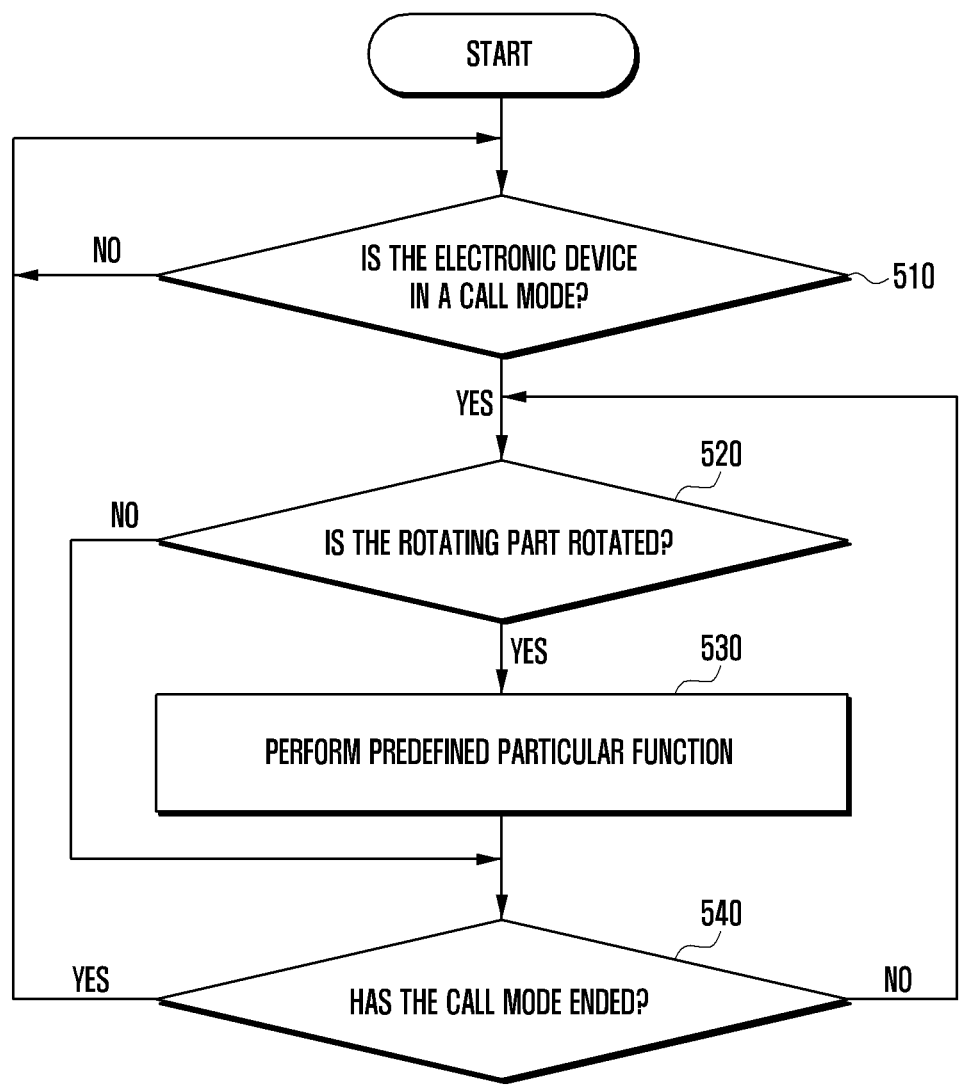
FIG. 5 is a flow diagram illustrating a process of performing a particular function corresponding to the rotation of a rotating part in accordance with an embodiment of the present disclosure.

FIG. 5 is a flow diagram illustrating an example process of performing a particular function corresponding to the rotation of a rotating part in accordance with an embodiment of the present disclosure.

Referring to FIGS. 1 and 5, at operation 510, the control unit 170 determines whether a current operating mode of the electronic device 100 is a call mode. Here, a call mode may be a state where a call application is loaded from the secondary memory to the main memory and is running by the operating system. Also, a call mode may be a state where a specific image (e.g., an image containing a call button) associated with a call application is displayed on the screen. Alternatively, a call mode may be a call-live state, namely, a state where the electronic device performs a call with an external device. Alternatively, a call mode may be a state where a call screen is turned off in response to approach sensing of the proximity sensor, namely, a state where a user grips the electronic device as shown in FIG. 2B and holds the receiver 210 to his or her ear.

In case the electronic device 100 is in a call mode, the control unit 170 may determine at operation 520 whether the rotating part 155 is rotated. Namely, when a user rotates the rotating part 155, the rotation detector 157 detects the rotation of the rotating part 155, creates sensing information, and transfers the sensing information to the control unit 170. Then, based on the sensing information received from the rotation detector 157, the control unit 170 recognizes that the rotation of the rotating part 155 happens.

In case the rotating part 155 is rotated, the control unit 170 performs a predefined particular function at operation 530. Further, at this operation, the control unit 170 may deactivate the actuator 156 so as to prevent power consumption of the actuator 156. Also, at this operation, the control unit 170 may offer a user feedback about the performance of a function. For example, the control unit 17 may control the vibration motor to create vibration as a tactile feedback. Additionally or alternatively, the control unit 170 may control the audio processing unit 140 to output voice or sound data as an auditory feedback.

Meanwhile, a predefined particular function may be set by a manufacturer or a user. For example, a predefined particular function may be a redial function to try a call again to the most recently called party's device in a recent call log.

Namely, when the rotation of the rotating part 155 is recognized, the control unit 170 may find the most recent call information in a recent call log stored in the memory unit 160 and, based on the found information, control the wireless communication unit 130 to transmit a call request message to the other party's device. Alternatively, a predefined particular function may be a redial function to try a call again to the most recently called party's device in a frequently contacted list. Alternatively, a predefined particular function may be a dial function to try a call to the most recent party's device in a missed call list. Alternatively, a predefined particular function may be a dial function to try a call to a predefined party's device.

A predefined particular function may be a call termination function. Namely, when the rotation of the rotating part 155 is recognized, the control unit 170 may control the wireless communication unit 130 to disconnect a current call.

A predefined particular function may be a function to transmit predefined information to an external device. In this case, predefined information may be location information, a phone number, a thumbnail image, etc. of the electronic device 100. Meanwhile, an external device may be the other party's device of a current call. When the rotation of the rotating part 155 is recognized, the control unit 170 may control the wireless communication unit 130 to transmit such predefined information to such an external device.

A predefined particular function may be a voice modulation function. Namely, when the rotation of the rotating part 155 is recognized, the control unit 170 may control the audio processing unit 140 to modulate a voice signal received from the microphone 142. Then the control unit 170 may control the wireless communication unit 130 to transmit the modulated voice signal to the other party's device of a current call.

A predefined particular function may be a noise removal function. Namely, when the rotation of the rotating part 155 is recognized, the control unit 170 may control the audio processing unit 140 to modify an echo noise value. Then the audio processing unit 140 may remove a noise from a voice signal received from the microphone 142, based on the modified echo noise value, and also transfer the noise-removed voice signal to the control unit 170. Then the control unit 170 may control the wireless communication unit 130 to transmit the noise-removed voice signal to the other party's device of a current call.

A predefined particular function may be a call switch function. For example, in a call with the first external device, the wireless communication unit 130 may receive a call request message from the second external device and report the arrival of a call request message to the control unit 170. Then the control unit 170 may inform a user about the reception of a call request message. For example, the control unit 170 may control the vibration motor to create vibration or control the audio processing unit 140 to output voice or sound data. At this time, a user who desires a call switch may rotate the rotating part 155. Then the control unit 170 may recognize the rotation of the rotating part 155 and control the wireless communication unit 130 to perform a call with the second external device. Meanwhile, together with such a call switch, the control unit 170 may control the wireless communication unit 130 to transmit a hold request message to the first external device or to disconnect a call with the first external device.

If the rotation of the rotating part 155 is not detected at operation 520, the control unit 170 may determine at operation 540 whether a call mode is ended. If a call mode is ended, the process may return to operation 510. If a call mode is not ended yet, the process may return to operation 520.

Figure 6:
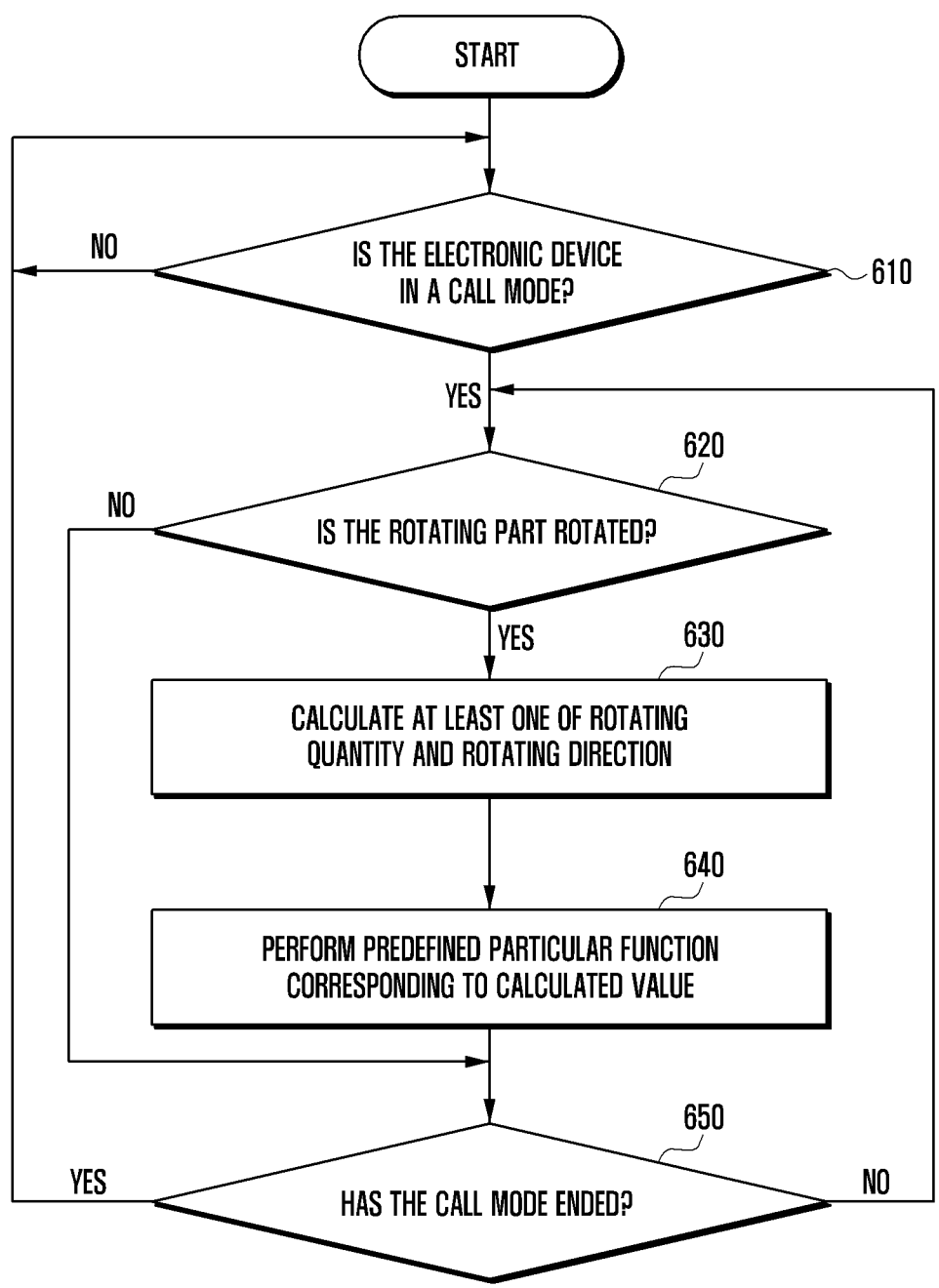
FIG. 6 is a flow diagram illustrating a process of performing a particular function corresponding to the rotation of a rotating part in accordance with another embodiment of the present disclosure.

FIG. 6 is a flow diagram illustrating a process of performing a particular function corresponding to the rotation of a rotating part in accordance with another embodiment of the present disclosure.

Referring to FIGS. 1 and 6, at operation 610, the control unit 170 determines whether a current operating mode of the electronic device 100 is a call mode. In case of a call mode, the control unit 170 determines at operation 620 whether the rotating part 155 is rotated. In case the rotation of the rotating part 155 is recognized, the control unit 170 calculates at least one of a rotating quantity or a rotating direction at operation 630, based on sensing information received from the rotation detector 157. Then, at operation 640, the control unit 170 performs a predefined particular function corresponding to a calculated value. Herein, the repetition of descriptions about the performance of a predefined particular function will be avoided.

If the rotation of the rotating part 155 is not detected at operation 620, the control unit 170 may determine at operation 650 whether a call mode is ended. If a call mode is ended, the process may return to operation 610. If a call mode is not ended yet, the process may return to operation 620.

The above-discussed method is described herein with reference to flowchart illustrations of user interfaces, methods, and computer program products according to embodiments of the present disclosure. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

The functions and process steps herein may be performed automatically or wholly or partially in response to user command. An activity (including a step) performed automatically is performed in response to executable instruction or device operation without user direct initiation of the activity.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se.

While this disclosure has been particularly shown and described with reference to an example embodiment thereof, it will be understood by those skilled in the art that various changes in form and details may be made therein without departing from the ambit of this disclosure as defined by the appended claims.

What is claimed is:

1. A method for operating an electronic device that includes a wireless communication unit for a call and a camera having a rotating part disposed on a body tube of the camera, the method comprising:
    detecting whether a call mode is active; and
    in response to detecting a rotation of the rotating part, executing a first function when the call mode is active and a second function when the call mode is inactive, the first function is executed according to at least one rotational quantity of the rotating part,
    wherein the at least one rotational quantity of the rotating part includes a first rotation quantity that includes a first rotation degree that corresponds to a selection of a first predetermined operation, a second rotation quantity that includes a second rotation degree that corresponds to a selection of a second predetermined operation, and a third rotation quantity that includes a third rotation degree that corresponds to a selection of a third predetermined operation, and
    wherein the camera is disposed protrudingly on a surface of the electronic device, and the rotating part includes a shape enclosing the body tube of the camera.

2. The method of claim 1, wherein the call mode further comprises at least one of:
    executing a call application within an operating system,
    displaying a specific image associated with the call application on a screen of the electronic device,
    executing a call with an external device by the electronic device, and
    deactivating a call screen in response to sensing approach of an object via a proximity sensor of the electronic device.

3. The method of claim 2, wherein the first function comprises at least one of:
    a call log redial function including re-dialing a most recently called party according to a recent call log,
    a contact list redial function including re-dialing the most recently called party in a frequent contact list,
    a missed call dial function including calling the most recent party in a missed call list,
    a party dial function including calling a predefined party,
    a call termination function including termination of a current call,
    a transmission function including transmission oft predefined information to the external device,
    a voice modulation function,
    a noise removal function, and
    a call switch function.

4. The method of claim 1, further comprising:
    generating feedback in response to executing the first function, the generated feedback including at least one of an auditory feedback and a tactile feedback.

5. The method of claim 1, further comprising:
    deactivating an actuator of the camera in response to the rotation.

6. The method of claim 1, wherein the first function is selected from among a plurality of functions for execution according to a position of the rotating part after the rotation.

7. An electronic device comprising:
    a camera having a rotating part disposed on a body tube of the cameras;
    a wireless communication unit configured to support a call function; and
    at least one processor executing a function performing module configured to
        detect whether a call mode is active, and
        in response to detecting a rotation of the rotating part, execute a first function when the call mode is active and a second function when the call mode is inactive, the first function is executed according to at least one rotational quantity of the rotating part,
    wherein the at least one rotational quantity of the rotating part includes a first rotation quantity that includes a first rotation degree that corresponds to a selection of a first predetermined operation, a second rotation quantity that includes a second rotation degree that corresponds to a selection of a second predetermined operation, and a third rotation quantity that includes a third rotation degree that corresponds to a selection of a third predetermined operation, and
    wherein the camera is disposed protrudingly on a surface of the electronic device, and the rotating part includes a shape enclosing the body tube of the camera.

8. The electronic device of claim 7, wherein the function performing module is further configured to detect whether an operating mode of the electronic device is the call mode, wherein the call mode further comprises at least one of:
- executing a call application within an operating system,
- displaying a specific image associated with the call application on a screen of the electronic device,
- executing a call with an external device by the electronic device, and
- deactivating a call screen being in response to sensing approach of an object via a proximity sensor of the electronic device.

9. The electronic device of claim 8, wherein the first function comprises at least one of:
- a call log redial function including re-dialing a most recently called party according to a recent call log,
- a contact list redial function including re-dialing the most recently called party in a frequent contact list,
- a missed call dial function including calling the most recent party in a missed call list,
- a party dial function including calling a predefined party,
- a call termination function,
- a transmission function including transmitting predefined information to the external device,
- a voice modulation function,
- a noise removal function, and
- a call switch function.

10. The electronic device of claim 7, wherein the function performing module is further configured to generate feedback in response to executing the first function, the feedback including at least one of an auditory feedback and a tactile feedback.

11. The electronic device of claim 7, wherein the function performing module is further configured to deactivate an actuator of the camera in response to the rotation.

12. The electronic device of claim 7, wherein the first function is selected from among a plurality of functions for execution according to a position of the rotating part after the rotation.

13. The electronic device of claim 7, further comprising a receiver disposed on a front face of the electronic device, wherein the camera is disposed on a rear face of the electronic device.

14. The electronic device of claim 13, further comprising:
- a display unit disposed on the front face; and below the receiver when the electronic device is held in an upright position.

15. The electronic device of claim 7, wherein the at least one processor includes an application processor.

* * * * *